Figure 3:
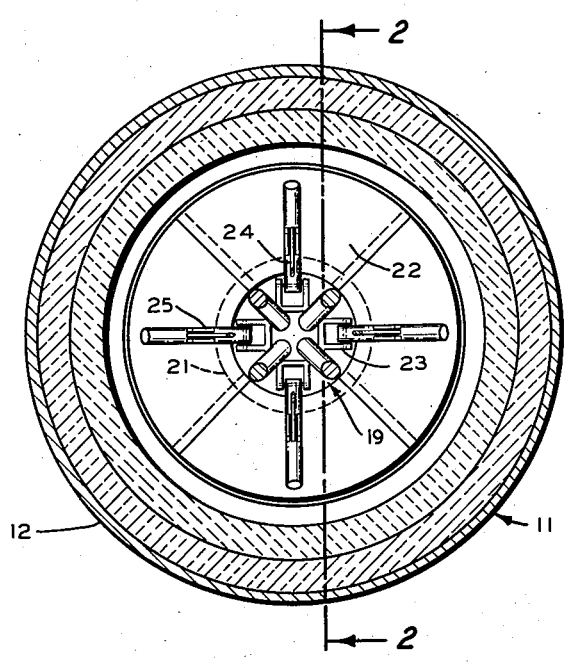

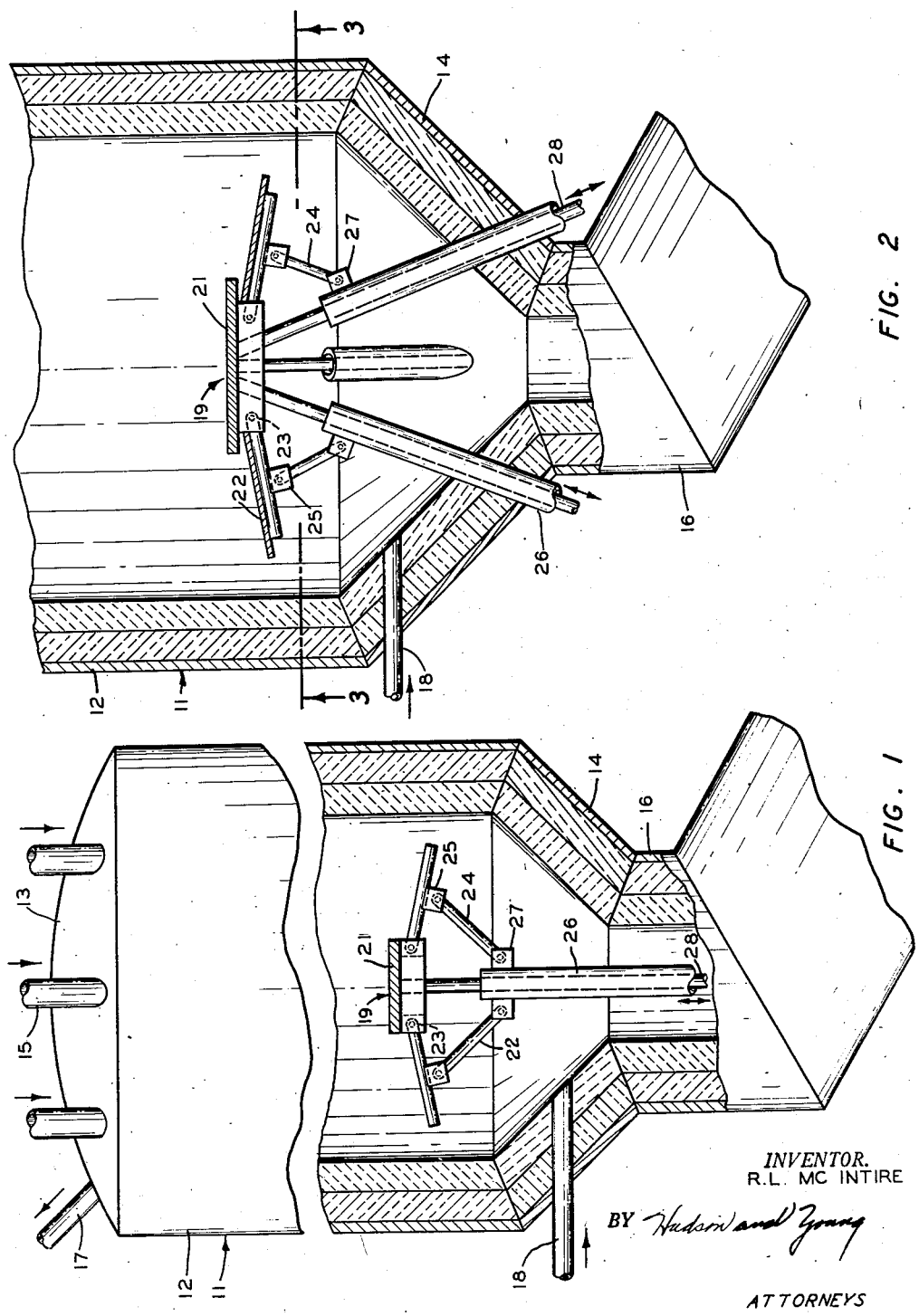

Jan. 18, 1955  R. L. McINTIRE  2,699,987
PEBBLE HEAT EXCHANGE CHAMBER
Filed Dec. 4, 1951  2 Sheets-Sheet 2

INVENTOR.
R.L. MC INTIRE
BY Hudson and Young
ATTORNEYS

United States Patent Office 2,699,987
Patented Jan. 18, 1955

2,699,987

PEBBLE HEAT EXCHANGE CHAMBER

Robert L. McIntire, Bartlesville, Okla., assignor to Phillips Petroleum Company, a corporation of Delaware Application December 4, 1951, Serial No. 259,761

8 Claims. (Cl. 23—284)

This invention relates to pebble heater apparatus. In one of its more specific aspects, it relates to improved pebble heater and reaction chambers of pebble heater apparatus. In another of its more specific aspects, it relates to a method of regulating pebble flow through pebble heater apparatus. In another of its more specific aspects, it relates to a method of obtaining more nearly equal pebble-gas contact time through pebble heater and reaction chambers.

Thermal conversion processes which are carried out in so-called pebble heater apparatus utilize a flowing mass of solid heat exchange material, which mass is heated to a high temperature by passing hot gas therethrough in a first direct heat exchange step and is then caused to contact gaseous reactant materials, furnishing heat thereto in a second direct heat exchange. The conventional pebble heater apparatus generally comprises two chambers which may be disposed in substantially vertical alignment. The solid heat exchange material is introduced into the upper portion of the first or upper chamber. That material forms a moving bed of solid heat exchange material which flows downwardly through the chamber in direct heat exchange with hot gaseous heat exchange material. The solid heat exchange material is heated to a high temperature in the heat exchange and is then passed to a second chamber in which the hot solid heat exchange material is caused to contact gaseous reactant materials in a second direct heat exchange relation, furnishing heat for the treatment or conversion of the gaseous materials.

Conventional pebble heater chambers of pebble heater apparatus are generally formed as cylinders and a solid heat exchange material is passed thereinto in the form of a moving bed. Hot heat exchange gases are sometimes introduced into the upper cylindrical bed at the lower end and at the periphery of such chambers and are sometimes introduced through a perforate refractory arch which supports the moving pebble bed. The solid heat exchange material is drawn from a substantially central point in the bottom of the bed and is passed downwardly into a gas heating chamber where a second moving bed of solid heat exchange material is formed. One disadvantage of conventional pebble chambers in which a relatively shallow pebble bed is maintained and which has a single pebble outlet in its lower end is that it is most difficult to establish uniform flow of uniformly heated solid heat exchange material through the pebble chambers. In a chamber in which the withdrawal of solid heat exchange material is made from a substantially central point in the bottom of the pebble chamber, the center of the pebble bed tends to drop out at all levels in the pebble bed below a dimension in the neighborhood of less than one and one-half times the diameter of the cylinder served by the single pebble outlet. Another disadvantage of the conventional pebble heater apparatus is that gas which is injected into the pebble chamber does not have a uniform contact time through the entire length of the pebble bed.

Each feed to a reactor chamber of pebble heater apparatus has different characteristics. In particular, these characteristics cause different temperature gradients in the pebbles across the surface of the reactor bed. This is the case regardless of whether multiple inlets or a single pebble inlet is provided in the reactor. Thus, a reactor which is designed to crack normal butane (with a heat of reaction of about 850 B. t. u./lb.) will have a smaller temperature gradient across the top of the bed than the same reactor will have when it is converted to crack ethane (with a heat of reaction about 2100 B. t. u./lb.) The same reactor will thus, necessarily have to be modified somewhat in order to obtain the most efficient cracking of both feeds. It should also be noted that any reactor which is designed and placed in operation for the first time will also require some adjustment to bring about the most efficient operation thereof. My invention makes possible the modification of such pebble heat exchange chambers in a rapid and feasible manner.

Solid heat exchange material which is conventionally used in pebble heater apparatus is generally called "pebbles." The term "pebbles" as used herein denotes any solid refractory material of flowable size and form, having strength which is suitable to carry large amounts of heat from the pebble heating chamber to the gas heating chamber without rapid deterioration or substantial breaking. Pebbles conventionally used in pebble heater apparatus are substantially spherical and range from about one-eighth inch to about one inch in diameter. In a high temperature process, pebbles having a diameter between one-fourth and three-eighths inch are preferred. The pebbles must be formed of a refractory material which will withstand temperatures at least as high as the highest temperatures attained in the pebble heating chamber. The pebbles must also be capable of withstanding temperature changes within the apparatus. Refractory materials, such as metal alloys, ceramics, or other material having the properties above described may be utilized to form such pebbles. Silicon carbide, alumina, periclase, beryllia, Stellite, zirconia, and mullite may be satisfactorily used to form such pebbles or may be used in admixture with each other or with other materials. Pebbles formed of such materials, when properly fired, serve very well in high temperatures, some withstanding temperatures up to about 4000° F. Pebbles which are used may be either inert or catalytic when used in any selected process.

An object of this invention is to provide improved means for thermally treating or reacting gaseous materials. Another object of the invention is to provide improved means for controlling the pebble flow through pebble heater apparatus. Another object of the invention is to provide means for controlling flow of pebbles through a pebble heat exchange chamber so as to obtain a lower temperature gradient across the top of the pebble bed within that chamber. Another object of the invention is to provide a method for obtaining more uniform cracking of hydrocarbon materials in a pebble reactor chamber. Other and further objects of the invention will be apparent upon study of the accompanying disclosure. It least one of the above objects will be attained by at least one aspect of this invention.

Figure 4:
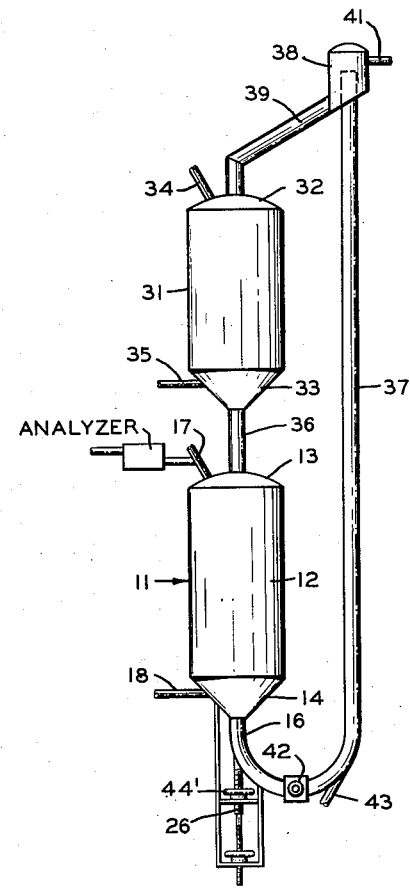

Broadly speaking this invention resides in the improvement in pebble heat exchange chambers which comprises a baffle in the lower portion of such pebble chamber spaced above the pebble outlet conduit and adapted so as to be variable in area. Better understanding of this invention will be apparent upon study of the diagrammatic drawings in which Figure 1 is a vertical section of a chamber embodying the invention. Figure 2 is a sectional view in elevation of a pebble chamber embodying a preferred modification of this invention with overlapping baffle extensions. Figure 3 is a bottom view of the baffle of this invention showing both the bar and overlapping extensions. Figure 4 is a schematic view of a pebble heater apparatus.

Referring particularly to Figure 1 of the drawings, pebble chamber 11 comprises upright elongated shell 12 closed at its upper and lower ends by closure members 13 and 14, respectively. Pebble inlet conduits 15 are provided in the upper end portion of shell 12 preferably in closure member 13 and pebble outlet conduit 16 is provided in the lower end of closure member 14. Gaseous effluent outlet conduit 17 is provided in the upper end portion of shell 12, preferably in closure member 13 and gaseous material inlet conduit 18 extends into the lower portion of shell 12 preferably communicating with the interior of chamber 11 through closure member 14. Although inlet conduit 18 is diagrammatically shown as a single conduit, it may be in the form of a header member extending at least part of the distance around closure member 14 and communicating with the interior of chamber 11 through that closure member. Pebble inlet conduits 15 may be positioned and spaced peripherally around the top of chamber 11 or they may be combined as a single inlet conduit which can be axially positioned in the top of such chamber.

Pebble baffle member 19 is provided in the lower portion of chamber 11 and spaced above pebble outlet conduit 16. Baffle member 19 comprises a central platform 21 which may be of very small or intermediate diameter. Platform 21 as shown in Figure 1 is of small diameter and peripheral members 22 which are hinged at 23 are raised or lowered by means of support members 24 hinged to the lower sides of peripheral members 22 at points 25. Support members 24 are hinged to an axially positioned support member 26 at points 27. Platform 21 is supported on an axially positioned support member 28. Support member 28 extends through support member 26 and the two axial support members extend upwardly and coaxially through pebble outlet conduit 16.

Better understanding of the structure of baffle member 19 will be obtained upon reference to Figure 3 of the drawings. Although this structure shown as bottom view of baffle member 19 shows only 4 peripheral members 22 and support members 24, more or less of these members may be utilized if desired. Peripheral members 22 are preferably designed as individual bars uniformly spaced and radially extending from platform 21 or may be designed so as to overlap thus making a continuous circular baffle which can be increased or decreased in diameter within the limits of the overall diameter of the wholly extended baffle and the collapsed peripheral members. A plurality of narrow, uniformly spaced bar-like extensions provide uniform disturbance of the normal flow pattern. Thus, when several such members are used, pebble flow in the annulus between baffle 21 and shell 11 is sufficiently delayed. As such members are lowered, the baffling of flow of pebbles closer to platform 21 is increased. As the narrow members are raised, some disturbance of pebble flow in the area adjacent the outer end portions of those members is obtained. The variation in the extension of members 22 or in diameter of baffle member 19 may be accomplished quite easily by maintaining one or the other of axial support members 26 or 28 fixed in a rigid position and moving the other axial support member along its longitudinal axis. It is preferred to maintain support member 26 in a fixed position and to move support member 28 in order to adjust the position of members 22 or the diameter of baffle member 19. Operation in this manner permits the movement of the support member without encountering a binding action of the pebble mass within the pebble chamber. If this type of operation is utilized, support member 28 will be raised prior to filling chamber 11 with the pebble mass so that peripheral members 22 are in a collapsed position. The chamber is put into operation and an analysis is made of the gaseous effluent removed from the upper portion of the chamber through effluent conduit 17. Support member 28 is then slowly lowered while analysis of the gaseous effluent is continued. As the desired reaction product reaches an optimum amount support member 28 is fixed in position and baffle member 19 is maintained in that position during the operation of that chamber with that feed.

When it is desired to utilize support member 26 for varying the position of members 22 or the diameter of baffle member 19, support member 28 is maintained in a fixed position and peripheral members 22 are fully extended before chamber 11 is filled with the mass of pebbles. Operation of the pebble chamber is begun and once again an analysis of the gaseous effluent removed through conduit 17 is obtained. Support member 26 is then slowly lowered so as to allow peripheral members 22 to slowly collapse about support member 26 until the continuing analysis of the gaseous effluent indicates that an optimum flow of pebbles through chamber 11 has been obtained. At that time support member 26 is fixed in that position and the operation of chamber 11 is continued with baffle member 19 fixed as to diameter as long as that specific feed is utilized.

Baffle member 19 may be modified by the use of a central platform 21 of intermediate diameter. When such a structure is utilized, peripheral members 22 are shorter and there will be a lesser variation in the overall diameter of baffle member 19. In this modification a plurality of support members 26 and 28 is utilized for regulating the positioning of peripheral members 22. As many members 19 may be utilized as desired so long as they are uniformly spaced.

Referring particularly to Figure 4 of the drawings, the pebble heater apparatus comprises an upright elongated pebble heater shell 31 closed at its upper and lower ends by closure members 32 and 33, respectively. Gaseous effluent conduit 34 extends from the upper portion of the chamber and heating material inlet means 35 extends into the lower portion of that chamber. Reactor chamber 11 is positioned below chamber 31 and pebble conduit 36 extends between closure member 33 of chamber 31 and closure member 13 of chamber 11. Gaseous effluent conduit 17 is positioned in the upper end portion of chamber 11. An analyzer is operatively connected to conduit 17. Gaseous material inlet conduit 18 is provided in the lower portion of chamber 11. Pebble outlet conduit 16 extends downwardly from closure member 14 of chamber 11 and is connected to lower end portion of elevator 37. Elevator 37 may be either a mechanical-type elevator such as a bucket or screw-conveyor type or may be a gas-lift type such as is exemplified in Figure 4. In the design shown in the drawings, separator chamber 38 is provided at the upper end portion of elevator 37 and pebble conduit 39 extends downwardly from the lower end portion of separator chamber 38 to the upper end portion of pebble chamber 31. Gaseous effluent conduit 41 is provided in the upper end portion of separator chamber 38. Pebble feeder 42 is provided intermediate the ends of pebble conduit 16 and may be any one of the conventional pebble feeders utilized such as a star valve, a gate valve, a rotatable table feeder, or the like. Lift-gas inlet conduit 43 is provided downstream of feeder 42.

In the particular modification shown in Figure 4, support member 26 is adjustably maintained by means of adjusting wheel 44' threadedly cooperating therewith and support member 28 is threaded in its lower end portion and is varied in its longitudinal position by means of adjusting wheel 44 threadedly cooperating therewith. Various means for varying the position of the support members 26 and 28 may be utilized and the specific means shown in Figure 4 should not be deemed as unduly limiting the invention. Another type of adjusting means which may be utilized includes a linking arrangement whereby a link extending laterally from one of the support members is supported intermediate its ends on a fulcrum and a pressurizing means such as a screw-type device is connected to the end of that link opposite that which is connected to the support members 26 or 28.

In the operation of the pebble heater apparatus of Figure 4, pebbles are heated in chamber 31 by contact with hot gaseous heat exchange material, the heating of which may result from the combustion of fuel outside of that chamber or in the lower portion of the chamber in a combustion zone separated from the pebble mass, or by burning a fuel in direct contact with the pebble mass within chamber 31. Pebbles are introduced into that chamber through conduit 39 and form a contiguous gravitating mass therein which extends downwardly through pebble conduit 36, chamber 11 and conduit 16 to pebble feeder 42. The pebbles are heated in chamber 31 to temperatures generally in the range of 1400° F. to 3200° F. The hot pebbles are then gravitated from chamber 31 through conduit 36 into the upper portion of chamber 11. Generally pebble inlet temperatures in chamber 11 are about 100° F. to 200° F. below the highest temperature of the pebbles within the first chamber. In the process for the production of ethylene from light hydrocarbon, such as ethane or propane, the pebble temperature in the reaction chamber is usually in the range of 1200° F. to 1800° F. For the production of acetylene by pyrolysis of hydrocarbons, temperatures in the range of 1800° F. to 3000° F. are generally desirable.

Baffle member 19 is varied as to the extension of members 22 or diameter so as to slow the flow of hotter pebbles through the reactor chamber and if possible to speed the flow of cooler pebbles through the reactor chamber. In this manner, pebbles which would normally be cooler are removed from the chamber at such a rate as to reduce the time during which they contact gaseous reactant materials and hot pebbles take the place of those cooler pebbles at a faster rate so that the temperature of the pebbles with which the reactant materials are contacted is maintained more uniform than would be possible if a fixed baffle were provided in that chamber. The specific operation of the baffle will depend upon whether or not a single central pebble inlet is utilized or whether a plurality of peripherally positioned pebble inlet conduits are utilized. If a central pebble inlet conduit is utilized, it will normally be necessary to expand the diameter of baffle member 19 more than at a time when peripherally positioned pebble inlets are used.

The flow of pebbles through the pebble chambers is controlled by the operation of pebble flow controller 42. As the pebbles are fed from the downstream end of that flow controller they are entrained in a stream of lift-gas introduced through conduit 43 and are elevated to the separator chamber 38. In this chamber, the pebbles are allowed to settle out of the gas stream and gravitate downwardly through conduit 39 into the upper portion of chamber 31. The lift-gas is removed from separator chamber 38 through effluent outlet conduit 41.

Support members 26 and 28 will necessarily have to be so connected to pebble outlet conduit 16, or closure member 14 in the case of modification of Figure 2, that the escape of hot gaseous material thereabout will be substantially obviated. Any of the conventional means of packing the passage through which one or both of these support members slidably pass can be utilized.

Although this invention has been discussed particularly with respect to support members 26 and 28 being concentric, it should be understood that these support members can be separately positioned and arranged. Members 22 can also be wider than bar members but not wide enough to overlap each other when in an extended position.

Any conventional analyzer can be used for the purpose of determining the point of proper adjustment of the baffle. On type analyzer which can be utilized is a double-beam infra-red analyzer such as is disclosed in application Serial Number 103,158, filed July 5, 1949, by Joseph W. Hutchins, now Patent No. 2,579,825.

Various modifications of this invention will be apparent to those skilled in the art upon study of the accompanying disclosure. Such modifications are believed to be within the spirit and scope of this invention.

I claim:

1. An improved pebble heat exchange chamber comprising in combination a closed, upright, elongated shell; pebble inlet means in the upper end portion of said shell; gaseous effluent conduit means in the upper end portion of said shell; fluid material inlet means in the lower end portion of said shell; pebble outlet conduit means in the lower portion of said shell; a central baffle axially positioned in the lower portion of the chamber formed within said shell; a plurality of baffle members, uniformly spaced, flexibly connected to and radially extending outwardly from said central baffle; at least one first support member extending from the lower portion of said shell and connected to said central baffle; at least one second support member extending from the lower portion of said shell and connected to each said baffle section, at least one of the group of first and second support members being longitudinally extensible.

2. An improved pebble heat exchange chamber comprising in combination a closed, upright, elongated shell; pebble inlet means in the upper end portion of said shell; gaseous effluent conduit means in the upper end portion portion of said shell; pebble outlet conduit means in the of said shell; fluid material inlet means in the lower end lower portion of said shell; a central baffle axially positioned in the lower portion of the chamber formed within said shell; a plurality of baffle sections, flexibly connected to and extending outwardly from said central baffle; at least one support member extending from the lower portion of said shell and connected to said central baffle; a second support member concentrically positioned with respect to each said first support member; at least one link member flexibly connecting each said baffle section to a second support, at least one of the group of first and second support members being longitudinally extensible.

3. The pebble heat exchange chamber of claim 2, wherein said first support member is provided with longitudinal adjusting means.

4. The pebble heat exchange chamber of claim 3, wherein said first support member is provided with a threaded portion and an adjusting wheel, rotatably fixed in place, threadedly cooperates with said first support member.

5. The pebble heat exchange chamber of claim 2, wherein said second support member is provided with longitudinal adjusting means.

6. The pebble heat exchange chamber of claim 5, wherein said second support member is provided with a threaded portion and an adjusting wheel rotatably fixed in place threadedly cooperates with said second support member.

7. An improved pebble heat exchange chamber comprising in combination a closed, upright, elongated shell; pebble inlet means in the upper end portion of said shell; gaseous effluent conduit means in the upper end portion of said shell; fluid material inlet means in the lower end portion of said shell; pebble outlet conduit means in the lower portion of said shell; a central baffle axially positioned in the lower portion of the chamber formed within said shell; a plurality of baffle sections, overlapping at their edges, flexibly connected to and extending outwardly from said central baffle and forming an extensible peripheral lip for said central baffle; at least one first support member extending from the lower portion of said shell and connected to said central baffle; at least one second support member extending from the lower portion of said shell and connected to each said baffle section, at least one of the group of first and second support members being longitudinally extensible.

8. An improved pebble heat exchange chamber comprising in combination a closed, upright, elongated shell; pebble inlet means in the upper end portion of said shell; gaseous effluent conduit means in the upper end portion of said shell; fluid material inlet means in the lower end portion of said shell; pebble outlet conduit means in the lower portion of said shell; a central baffle axially positioned in the lower portion of the chamber formed within said shell; a plurality of baffle sections, overlapping at their edges, flexibly connected to and extending outwardly from said central baffle and forming an extensible peripheral lip for said central baffle; at least one support member extending from the lower portion of said shell and connected to said central baffle; a second support member concentrically positioned with respect to each said first support member; at least one link member flexibly connecting each said baffle section to a second support, at least one of the group of first and second support members being longitudinally extensible.

References Cited in the file of this patent

UNITED STATES PATENTS

| | | |
|---|---|---|
| 2,448,922 | Simpson et al. | Sept. 7, 1948 |
| 2,489,628 | Evans | Nov. 29, 1949 |
| 2,520,164 | Norton, Jr. | Aug. 29, 1950 |
| 2,565,811 | Hall | Aug. 28, 1951 |